United States Patent [19]

Fisher

[11] Patent Number: 6,143,682
[45] Date of Patent: *Nov. 7, 2000

[54] BIMETALLOCYCLIC TRANSITION METAL CATALYST SYSTEMS

[75] Inventor: Richard Allen Fisher, League City, Tex.

[73] Assignee: Exxon Chemical Patents Inc., Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/473,693

[22] Filed: Jun. 7, 1995

[51] Int. Cl.$^7$ .............................. B01J 31/00; B01J 37/00; C08F 4/02; C08F 4/60
[52] U.S. Cl. ........................... 502/103; 502/113; 502/117; 502/152; 502/154; 502/158; 502/162; 502/167; 526/127; 526/160; 526/161
[58] Field of Search .................................. 556/28, 42, 43, 556/51, 52, 54, 56; 502/103, 113, 117, 152; 526/127, 160, 161

[56] References Cited

U.S. PATENT DOCUMENTS

| | | | |
|---|---|---|---|
| 2,922,803 | 1/1960 | Kaufman | 556/52 |
| 4,716,205 | 12/1987 | Klabunde | 526/161 |
| 4,727,123 | 2/1988 | Weinert, Jr. et al. | 526/161 |
| 5,055,438 | 10/1991 | Canich | 502/117 |
| 5,162,466 | 11/1992 | Karol et al. | 502/103 |
| 5,198,401 | 3/1993 | Turner et al. | 502/155 |
| 5,278,119 | 1/1994 | Turner et al. | 502/103 |
| 5,318,935 | 6/1994 | Canich et al. | 502/103 |
| 5,324,800 | 6/1994 | Welborn et al. | 526/160 |
| 5,359,102 | 10/1994 | Inoue et al. | 502/117 |
| 5,372,980 | 12/1994 | Davis | 526/160 |
| 5,387,568 | 2/1995 | Ewen et al. | 502/103 |
| 5,525,678 | 6/1996 | Mink et al. | 526/114 |
| 5,616,751 | 4/1997 | Nakai et al. | 556/54 |
| 5,621,126 | 4/1997 | Canich et al. | 526/160 |

FOREIGN PATENT DOCUMENTS

| | | |
|---|---|---|
| 0 423 872 A2 | 4/1991 | European Pat. Off. . |
| 0 426 637 | 5/1991 | European Pat. Off. ............... 502/103 |
| 0 495 375 A2 | 7/1992 | European Pat. Off. . |
| 0 520 732 A1 | 12/1992 | European Pat. Off. . |
| 0 664 304 A2 | 7/1995 | European Pat. Off. . |
| 0 664 304 A3 | 7/1996 | European Pat. Off. . |
| WO 92/00333 | 1/1992 | WIPO . |
| WO 94/01471 | 1/1994 | WIPO . |

OTHER PUBLICATIONS

F. A. Cotton, G. Wilkinson, "Advanced Inorganic Chemistry", 4ed., pp. 694–701, 830–839, 1980.
"Cationic d$^0$ Metal Alkyls Incorporating Tetraaza–Macrocycle Ancillary Ligands. Synthesis and Reactivity of (Me$_8$taa)M(R)+ and (Me$_4$taen)M(R)+ (M=Zr, Hf) Complexes" Uhrhammer, et al, J. Am. Chem. Soc. 1993, 115, pp. 8493–8494, No Month Available.
Generation, Alkyne Cycloaddition, Arene C–H Activation, N–H Activation and Dative Ligand Trapping Reactions of the First Monomeric Imidozirconocene (Cp$_2$Zr=NR) Complexes' Walsh, et al, J. Am. Chem. Soc. 1988, 110, pp. 8729–8731, No Month Available.
"Tetrakisdimethylamidorzirconium And Its Dimethylamido Lithium Adduct: Structures of [Zr(NMe$_2$)$_4$]$_2$ And Zr(NMe$_2$)$_6$Li$_2$(THF)$_2$" Chisholm, et al, Polyhedron 1988, 7, pp. 2515–2520, No Month Available.
"Structures of [(CH$_3$)$_2$ (t–BuN)W]$_2$ ($\mu$–t–BuN)$_2$ and [((CH$_3$)$_2$N)$_2$Ti]$_2$($\mu$–t–BuN)$_2$. A Molecular Orbital Explanation of the Existence of Unsymmettrically or Symmetrically Bridging Organoimido Ligands" pp. 357–363, Thorn et al., J. Am. Chem. Soc., vol. 103, No. 2, 1981, No Month Available.
"Bridging Alkylimido Complexes of the Group 4B Transition Metals," pp. 2030–2032, W. Nugent et al., Inorganic Chemistry, vol. 18, No. 7, 1979, No Month Available.
"Metallo–Organic Compounds Containing Metal–Nitrogen Bonds," pp. 134–138, D.C. Bradley et al., Canadian J. of Chem., vol. 41, 1963, No Month Available.
P.S. Skell et al., J.Am.Chem.Soc., vol. 100, No. 3, p. 999, Feb. 1978.
Z. Xue et al., J.Am.Chem.Soc., vol. 117, No. 51, pp. 12746–12750, 1995.
I. P. Rothwell et al., Organometallics, vol. 6, No. 1, pp. 73–80, Jan. 1987.
Z. Xue et al., Organometallics, vol. 14, No. 11, pp. 4992–4993, Nov. 1995.
I.P. Rothwell, Polyhedron, vol. 11, No. 12, pp. 1559–1561, Dec. 1992.
Huq, Mowat Skopski, and Wilkinson, "Crystal Structure of Bis–m–trimethylsilylmethyli-dyne)tetrakis–(trimethylsilylmethyl)diniobium(v). A New Type of Carbon Bridging Group", (1971), pp. 1477–1478, J. Chem.Soc., Chem Commun., No Month Available.
Mowat and Wilkinson, "Elimination Stabilized Alkyls. Part III. Trimethylsilylmethyl and Neopentyl Alkyls of Transition Metals", (1973), pp. 1120–1124, J.C.S.Dalton, No Month Available.
Profilet, Rothwell and Rothwell, Surface–supported Group 5 Metal Organometallic Compounds for Catalytic Arene Hydrogenation, (1993), pp. 42–44 J. Chem Soc., Chem. Commun., No Month Available.
Schmidbaur, Scharf and Füller, Titanium–and Zirconium–organic Compounds with Simple Phosphorus Ylides, (1977), 32b(8), pp. 858–862, Z. Naturforschung (translated by Robert Saxon Feb. 10, 1995), No Month Available.

*Primary Examiner*—Mark L. Bell
*Assistant Examiner*—J. Pasterczyk
*Attorney, Agent, or Firm*—William G. Muller; Gerald D. Malpass, Jr.; Anthony R. Chi

[57] ABSTRACT

This invention relates to single site catalyst systems comprising activated bimetallocyclic transition metal compounds, and the use of these catalyst systems for the polymerization of ethylenically and acetylenically unsaturated monomers. The bimetallocyclic compounds comprise two metal atoms, selected from the group consisting of Group 4 or Group 5 metal atoms, connected through two covalent bridging links so as to form a cyclic compound having delocalized bonding in the cyclic structure. The exemplary bimetallocyclic compound bis-M-(trimethylsilylmethylidyne) tetrakis-(trimethylsilylmethyl) ditantalum activated with alumoxane and borate compounds is shown to be useful for preparing ethylene polymers having $M_n$ of at least 267,000 and MWD of about 2.3.

19 Claims, No Drawings

6,143,682

BIMETALLOCYCLIC TRANSITION METAL CATALYST SYSTEMS

FIELD OF THE INVENTION

This invention relates generally to single site polymerization catalyst systems comprising an activated bimetallocyclic compound, and to a process for polymerizing ethylenically or acetylenically unsaturated monomers. More specifically, this invention relates to the use of certain bimetallocyclic compounds of groups 4 and 5 of the Periodic Table of Elements as polymerization catalysts.

BACKGROUND OF THE INVENTION

There are many known methods and catalysts useful for the homo- or co-polymerization of olefins. For example, in what are generally referred to as a traditional Ziegler-Natta catalyst systems, transition metal compounds are cocatalyzed by an aluminum alkyl to generate catalysts capable of producing both high and low molecular weight polyolefins. The polymers produced in these systems are characterized by a very broad, sometimes multimodal, molecular weight distribution and, in the case of copolymers, uneven comonomer distribution, largely due to the presence of multiple sites capable of active polymerization and variances in the chemical stability and reactivity of those sites.

Among the many varieties of Ziegler-Natta catalysts studied, a particular class of catalysts comprising transition metal compounds possessing two cyclopentadienyl ligands ("metallocenes") cocatalyzed with aluminum alkyls, are known to successfully polymerize α-olefins. However, the activity of these systems was markedly low, until the development of the now well-known metallocene-alumoxane catalyst systems. Furthermore, these alumoxane-activated systems were observed to produce polymers having narrow Polydispersity Index, or MWD ($M_w/M_n$), in contrast to traditional Ziegler-Natta systems, since the catalyst systems were largely single site catalysts.

Since that time, others have developed further these metallocene based catalyst systems. Addition of covalent bridging linkages between the cyclopentadienyl ligands of the metallocene compounds yielded monometallocyclic compounds capable of active polymerization. See, for example, EP-A-0 129 368 and U.S. Pat. No. 5,324,800. Activation of such by ionizing activators yielded saturated bimetallic catalysts see U.S. Pat. No. 5,198,401. Heterocyclic, monocyclopentadienyl transition metal compounds have been shown to be effective olefin polymerization catalysts with both of alumoxane and noncoordinating anion precursor activators, see for example U.S. Pat. No. 5,055,438 and WO-A-92/00333, which additionally can yield saturated bimetallic catalysts. Though the foregoing are largely restricted to Group 4 transition metal compounds, extension to Group 5 and 6 metal compounds was illustrated in WO-A-94/01471. Though the foregoing are largely restricted to Group 4 transition metal compounds, extension to Group 5 and 6 metal compounds was illustrated in WO-A-94/01471. Cyclic transition metal compounds comprising a Group 4 metal and two amido groups connected by a covalent bridging group containing a Group 14 or 16 element have also demonstrated catalytic activity when activated by alumoxane compounds, see U.S. Pat. No. 5,318,935.

Stable bimetallocyclic compounds of the Group 5 metals Niobium and Tantalum have been synthesized and studied as reported in the academic literature. See, "Crystal Structure of Bis-M-trimethylsilylmethylidyne)tetrakis-(trimethylsilylmethyl)diniobium(v). A New Type of Carbon Bridging Group", Huq, Mowat, Skapski and Wilkinson, J. Chem Soc., Chem. Commun., 1477–1478(1971), and "Elimination Stabilized Alkyls. Part III. Trimethylsillylmethyl and Neopentyl Alkyls of Transition Metals", Mowat and Wilkinson, J. C. S. Dalton , 1120–1124 (1973). Similar compounds supported on silica have been reported to be active catalysts for the exhaustive hydrogenation of aromatic substrates, see "Surface-supported Group 5 Metal Organometallic Compounds for Catalytic Arene Hydrogenation", Profilet, Rothwell and Rothwell, J. Chem Soc., Chem. Commun., 42–44 (1993). Polymerization capability or activity are not reported.

In view of developments in the organometallic field that bulky ancillary ligands can be used to stabilize organometallic compounds of the early transition metals so that they will sustain a cationic charge without decomposing into catalytically inactive species, additional species capable of similar stability were sought. In particular, since each of the above systems in the patent art showed various capabilities with respect to polyolefin polymerization activities, molecular weight and microstructure capability, including levels of comonomer incorporation in polytheylene copolymers, new active but stable catalyst systems capable of single site catalysis were sought.

SUMMARY OF THE INVENTION

This invention relates to stable single site polymerization catalyst systems comprising an activated bimetallocyclic compound and the use of such catalyst systems to polymerize ethylenically or acetylenically unsaturated monomers. In a particular embodiment the invention includes bimetallocyclic compounds comprising two independently selected Group 4 or Group 5 metal atoms directly linked through two covalent bridging groups so as to form a cyclic compound having delocalized bonding such that the bimetallocyclic compounds can be activated by cocatalyst compositions into stable, active polymerization catalysts for ethylenically and acetylenically unsaturated monomers. The invention also comprises a method of polymerization comprising contacting one or more of ethylenically or acetylenically unsaturated monomers with the invention catalyst systems under polymerization conditions to produce polymers with relatively narrow molecular weight distributions and, optionally, high molecular weights.

DETAILED DESCRIPTION

The bimetallocyclic compounds of the invention are characterized by having at least two transition metal atoms in a cyclic structure bound together by delocalized π-bonding. The delocalized π-bonding in the cyclic structures provides a stabilized structure wherein the metal atoms can carry a cationic charge without becoming so reactive to arbitrary ligand abstraction that catalyst activity is lost. Additionally, it is significant that due to the electron sharing between the two metal atoms and the bridging structure between them, an essentially single site catalyst is formed. Ligand abstraction for activation thus appears to occur substantially at only one of the two available metal sites (the non-bridging ligand sites), the remaining metal atom-ligand bonds becoming too strongly held for further abstraction. A stable cationic charge thus occurs at one of the metal sites, which serves to facilitate olefinic insertion for polymerization, yet can be charge-balanced by an effective cocatalyst component. Additionally, the cyclic ligand structure created by the bridging groups appears to make the catalytically active metal site open to olefins of virtually all molecular sizes both allowing for good activity for ethylene polymerization and high incorporation of higher molecular weight olefinically or acetylenically unsaturated monomers. And though the individual Group 4 and 5 bimetallocyclic compounds of the invention are structurally similar to the biscyclopentadienyl metallocene compounds of the prior art in possessing a tetrahedral orientation, i.e., containing four coordinate metal atoms, the delocalized π-bonding in the cyclic structure of this invention serves to reduce the number of total electrons per metal atom so as to increase overall electrophilicity. In particular, the invention's bimetallocyclic compounds are more electron deficient possessing only 10 electrons per metal center compared to 16 electrons in biscyclopentadienyl systems and 14 electrons in monocyclopentadienyl systems. The increased electrophilicity relates directly to the ease by which unsaturated monomers are attracted to the site of polymerization activity, and inserted into a growing polymer chain. This is particularly important for the Group 5 metal compounds of the invention since the Group 5 single site catalysts of earlier developments typically have low polymerization activities.

Exemplary single site polymerization catalyst systems comprise activated bimetallocyclic transition metal compounds of groups 4 or 5 of the Periodic Table of Elements. Preferred bimetallocyclic transition metal compounds may be described as group 4 or 5 metal compounds containing covalent bridging groups linking together the metal atoms in a cyclic structure associated by delocalized π-bonding.

Most generally, bridged bimetallocyclic transition metal compounds may be represented by formula I:

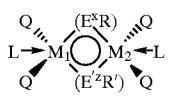

I wherein:
  $M_1$ and $M_2$ are independently a group 4 or 5 metal, preferably Ti, Zr, Hf, Nb, or Ta, in their highest oxidation state;
  each $E^xR$ and $E'^zR'$ is independently a bridging ligand in which each E and E' is independently an element selected from group 14 or 15 of the Periodic Table of Elements; x and z are the valencies of E and E', respectively, such that when E or E' is a group 14 element, their valency is defined as 4, and when E or E' is a group 15 element, their valency is defined as 3, n and m are the number of substituents necessary to complete the valency of E and E' subject to the constraints that when E or E' is a group 14 element x=n+3 and z=m+3, and that when E or E' is a group 15 element, x=n+2 and z=m+2;
  each R and R' is, independently, a radical selected from the group consisting of substituted or unsubstituted hydrocarbyl radicals, preferably $C_1$–$C_{30}$ hydrocarbyl radicals, substituted with $C_1$–$C_{30}$ hydrocarbyl radicals, provided that one or more of the hydrogen atoms on the hydrocarbyl radical is replaced by a halogen radical, a silyl radical, an amido radical, a phosphido radical, and alkoxy radical, or any other radical containing a Lewis acidic or basic functionality;
  each Q may be independently any univalent anionic ligand such as a halide, hydride, substituted or unsubstituted hydrocarbyl radicals, substituted or unsubstituted silyl, substituted or unsubstituted alkoxy radicals, substituted or unsubstituted aryloxy radicals, substituted or unsubstituted amido radicals, substituted or unsubstituted phosphido radicals, preferably having one to thirty carbon atoms, further provided that two Q together may form a dianionic chelating ligand;
  L is a neutral Lewis base, one or more of which may or may not be present, and which are represented by bases such as diethyl ether, tetrahydrofuran, dimethylaniline, aniline, trialkylophospine or triarylphosphine and the like.

Typically the hydrocarbyl substituents can be any of alkyl, aromatic alkylaromatic, arylaromatic, linear, branched or cyclic, including both fused and pendant ring systems.

The most preferred embodiment of this invention is represented by formula II in which $M_1$ and $M_2$ are the same transition metal element and are bridged symmetrically

I by identical groups $E^xR$. In bimetallocyclic group 5 catalyst systems, these bridging groups are typically alkylidyne group, $\equiv CR_n$, and, where R is defined as above, for example —Si(CH_3)_3, —Si(CH_2CH_3)_3 or —Si(t-C(CH_3)_3)_3. In bimetallocyclic group 4 catalyst systems, the bridging groups are typically independently selected from carbene, $CR_n$ where n=2, amido or phosphido groups ($NR_n$, $PR_n$ where n=1) where $R_n$ is selected from those members of the R and R' groups previously defined.

The activating cocatalysts include, but are not limited to group 13 alkyls, preferably aluminum alkyls; alumoxanes, preferably alkylalumoxanes; and ionizing reagents, preferably Bronsted acid salts, oxidizing metal salts, or covalent neutral compounds containing, or capable of providing, stable, compatible noncoordinating anions. Preferred activating cocatalysts include ionizing activator components which may be ion-exchange compounds comprising a cation, which will irreversibly react with at least one ligand, Q, contained in said transition metal compound and a noncoordinating anion which when functioning as a charge-balancing anion in the catalyst system is compatible, defined as not transferring an anionic substituent or fragment thereof to any cationic species formed as the result of the reaction. One or more of the cocatalyst activators may be used together so long as a Q ligand is abstracted to produce a transition metal cation which is then charge-balanced by the stable, bulky noncoordinating anion. For more information on noncoordinating anion systems, see U.S. Pat. Nos. 5,198, 401 and 5,278,119 see also, EP-A-0 426 637, EP-A-0 495 375 and EP-A-0 520 732 all of which are incorporated by reference for purposes of U.S. patent practice. As described in these documents the cocatalyst precursors may comprise as a cation portion of the activator component Bronsted acids such as protons or protonated Lewis bases, or may comprise reducible Lewis acids such as ferricinium, tropylium, triphenylcarbenium, or silver cations. Alternatively, the activator may be a neutral Lewis acid capable of abstracting a ligand Q, e.g., tris (pentafluorophenyl)boron, while contributing a counter-balancing noncoordinating anion. Typically these activators require the presence of a Q ligand that is readily abstractable, such as hydride, alkyl or silyl groups.

In general, suitable noncoordinating anions for the second component may be any stable and bulky anion or anionic complex typically having the following molecular attributes: 1) the anion is of a bulky size, for example having a molecular diameter about 4 Å or greater; 2) the negative charge should be delocalized over the framework of the anion or be localized within the core of the anion; 3) the anion should be a relatively poor nucleophile; and 4) the anion should not be a powerful reducing or oxidizing agent. Anions meeting these criteria such as boranes, polynuclear boranes, carboranes, metallacarboranes, polyoxoanions, and anionic coordination complexes are fully described in the literature above.

The activator component may also be a Lewis-acid complex which will react with at least one ligand, Q, of the first component, thereby forming an active catalytic species with the ligand from the metal component now bound to the Lewis-acid complex. Alumoxanes, and especially methylalumoxane, the product formed from the reaction of trimethylaluminum with substoichiometric quantities of water, are particularly preferred Lewis-acid second components. By use of an alumoxane, or even an alkylaluminum, as activator either alone or with a noncoordinating anion or precursor above, one or more Q ligand may be halogen, alkoxy or other non-alkyl ligand. Alkylation of the transition metal compound occurs and ionization by ligand abstraction is enabled.

Upon combination of the bimetallocyclic transition metal compound and the ionizing cocatalyst compounds above, the second compound, or at least a portion thereof, will react with one of the abstractable nonbridging ligands of the first component, thereby generating an ion pair consisting of the Group 5 or 6 bimetallocyclic transition-metal cation and the aforementioned anion, which anion is compatible with and noncoordinating to the Group 5 or 6 transition-metal cation formed from the bimetallocyclic compound. The anion must generally be capable of stabilizing the Group 5 or 6 transition-metal cations ability to function as a catalyst and must generally be sufficiently labile to permit displacement by an olefin, diolefin, or acetylenically unsaturated monomer during polymerization.

Catalyst System Preparation and Use

The bimetallocyclic compounds of the invention are prepared by conventional procedures as reported in the literature (see background). Thus bis-$\mu$-(trimethylsilylmethylidyne)tetrakis(trimethylsilylmethyl) ditantalum can be prepared by combining tantalum pentachloride, TaCl$_5$, and a Grignard reagent, e.g., trimethylsilylmethylmagnesium chloride, (CH$_3$)$_3$SiCH$_2$MgCl, in a polar solvent, e.g., diethyl ether, at room temperature. The compound is recovered by filtering, stripping, and recrystallizing from a hydrocarbon solvent. Further derivation is possible, see "Synthesesis and Structure of a Di-Tantalum (IV) Hexahydride Compound Containing Ancillary Amido Ligation", Profilet, et al, *Polyhedron, COMM.*, v. 11, no. 12, 1559–1561 (1992). Thus any Grignard reagent containing the connecting group —CH$_2$—MgX (where X is halogen), when contacted with the group 5 metal halide may serve as an entry into the bimetallocyclic compounds according to the invention.

The Group 4 bimetallocyclic compounds suitable as catalysts when activated as described may be prepared in accordance with procedures well known in the literature. Metathetical routes to amido and phosphido complexes of early transition metals are well established (Chisholm, M. H. et al., *Polyhedron* 1988, 7, pp 2215–2220). More recently, sigma-bond metathesis reactions have also been found useful in the synthesis amido complexes of group 4 metals (Uhrhammer, R. et al., *J. Amer. Chem. Soc.* 1993, 115, 8493). Group 4 bimetallocyclic compounds of formula II have also been synthesized by the method of Schmidbaur, see Z. Naturforschung, 32b(8), 858–862(1977). Finally, compounds of formula II have been reported by Walsh and Bergman (Walsh, P. J. et al., *J. Amer. Chem. Soc.* 1988, 110, 8729). These group 4 bimetallocyclic compounds possess cyclopentadienyl groups corresponding to Q in formula II. These ligands are known to be resistant to abstraction and these compounds are not therefore a preferred embodiment of the invention. As will be appreciated by those skilled in the art, the methodology described by Bergman and Walsh can easily be applied to prepare compounds which do not include cyclopentadienyl ligands such as the compounds of formula II.

The catalyst systems employed in this invention are preferably derived from the combining of the bimetallocyclic transition metal compounds of the invention with the activating cocatalyst. Typically convenient preparation of the catalyst system can be accomplished by combining the selected transition metal and activator components, in either order, in an alkane or aromatic hydrocarbon solvent. Alternatively, the bimetallocyclic transition metal compounds of the invention may be activated by first alkylating with an organoaluminium compound, such as an alkylalumoxane or alkylaluminium, and combined with an ionizing activator. In the most preferred processes the solvent utilized for activation would be suitable for use as a diluent for the subsequent polymerization, and when this is the case, the activation may be performed in situ in the polymerization reactor. Alternatively, the catalyst system may be prepared separately in either concentrated or dilute form and added to the polymerization reactor containing additional diluent as needed. Solvent systems which are suitable as solvents for the formation of the catalyst system and as diluents for subsequent polymerizations, include but are not limited to, straight and branched chain hydrocarbons such as isobutane, butane, pentane, hexane, heptane, octane, and the like, cyclic and alicyclic hydrocarbons such as cyclohexane, cycloheptane, methylcydohexane, and the like, and aromatic and alkyl-substituted aromatic compounds such as benzene, toluene, xylene and the like. Suitable solvents also include olefins which may act as monomers or comonomers such as ethylene, propylene, 1-butene, 1-hexene and the like, as well as bicyclic olefins such as norbornene, dicyclopentadiene, and the like.

In accordance with this invention, suitable polymerization results are obtained wherein the bimetallocyclic Group 4 or 5 transition metal component is present in the reaction diluent or solvent in a concentration anywhere from $10^{-5}$ to $10^{-1}$ mol./l., and the activator component in a concentration such that the ratio of the activator to the bridged bimetallocyclic transition metal component ranges from a molar value of about 1:1 (typical for discrete noncoordinating anion forming cocatalysts) to about 20,000:1 (highest typical range for alumoxane cocatalysts).

Polymerizations may be conducted by combining the activated transition metal compound with polymerizable monomers. This can be done in accordance with conventional olefin polymerization conditions well known in the art. In preferred embodiments of the process of this invention, the catalyst system is employed in liquid phase, (slurry, solution, suspension or bulk phase or combination thereof), high pressure liquid or supercritical fluid phase, or gas phase polymerizations of olefin monomers. These processes may employed singularly or in series. The liquid processes comprises the steps of contacting an olefin with the catalyst system in a suitable diluent and allowing said olefin monomer to react with the catalyst system for a time and at a temperature sufficient to produce polyolefin polymer. Bulk polymerization is typically done by contacting the catalyst with a slurry of liquid monomer, the catalyst typically being supported on a polymeric support or one of a metal oxide, such as silica or silica-alumina.

The supported catalyst may be prepared in accordance with the knowledge in the art with respect to the use of metallocene catalyst with alumoxane cocatalysts or that addressing the use of metallocenes with noncoordinating anions, for example, the activated catalyst can be supported in accordance with WO 91/0882. In view of the high activity of the catalysts, use of the methods disclosed in WO 93/11172 or in co-pending U.S. application Ser. No. 08/285, 380, filed Aug. 3, 1994, for preparing ionic catalyst systems chemically bound to the support are preferred. In this last method a neutral Lewis acid ionizing compound is reacted with hydroxyl group-containing metal oxide supports, preferably complexed with a Lewis base, and then reacted with the transition metal compound which is activated by protonation. Gas phase polymerization will also typically be conducted with supported versions of the invention catalysts. Additionally, the use of scavenging agents, e.g., alkylaluminum or alkylboron compounds, or alkylalumoxanes, is preferred for enhanced activity in accordance with conventional knowledge; see for example, U.S. Pat. No. 5,241, 025. The full description of each of the documents in this paragraph are incorporated by reference for purposes of U.S. patent practice.

The catalyst system components may be added to the polymerization vessel separately or after premixing the two components. The catalyst system may be used to polymerize olefins at a wide variety of temperatures. Typically this catalyst system may be used at temperatures from about −100° C. to 300° C. or more, and at pressures of up to 1500 bar, or more. Preferred temperatures include those between about −20 to about 280° C. However during the formation of the catalyst, temperatures from about 25 to about 100° C. are preferred, with temperatures of about 25 to about 75° C. being most preferred for catalyst formation. A high pressure polymerization utilizing higher temperatures such as that described in U.S. Pat. No. 5,408,017 can be effected with the catalysts of this invention as well. The catalyst system components, and the catalyst system once formed, should be protected from exposure to oxygen and water. Therefore the reaction necessary to prepare the catalyst system is preferably performed in an atmosphere which is free of oxygen and moisture, preferably, for example in an atmosphere of dry nitrogen, helium, or argon.

Preferred monomers that may be polymerized using the catalyst system of this invention include essentially any monomers having ethylenic or acetylenic unsaturation, particularly the olefinic and acetylenic monomers. Preferred monomers include aliphatic, branched and cyclic olefins and acetylenes. Particularly preferred monomers include $C_1$ to $C_{100}$ α-olefin monomers, preferably linear, branched or cyclic $C_1$ to $C_{20}$ α-olefin monomers, such as ethylene, propylene, butylene, pentene, hexene, heptene, octene, nonene, decene, undecene, dodecene, cyclobutene, cyclopentene, cyclohexene, cycloheptene, cyclooctene, cyclononene, cyclodecene, substituted and unsubstituted norbornenes, substituted and unsubstituted vinyl norbornenes, styrenes, alkyl-styrenes, para-alkyl-styrenes, α-alkyl-styrenes, 3-methyl-pentene-1, 4-methylpentene-1, 3,5,5-trimethylhexene-1, and the like. Dienes and other polyenes are also monomers that may be polymerized by the catalyst system described above. Preferred dienes include butadiene, dicyclopentadiene, ethylidene norbornene, methyl norbornene, nornadiene, 1,5 hexadiene, 1,6 heptadiene, tert dodecadiene and the like. It will be readily apparent to those of ordinary skill in the art that the monomers listed above can be homopolymerized or copolymerized with any of the other monomers listed.

EXAMPLES

The 1) and 2) bimetallocyclic compounds according to the invention below were made by the following procedure.

A group 5 compound 1), bis-M-(trimethylsilylmethylidyne)tetrakis-(trimethylsilylmethyl) ditantalum, was prepared by mixing tantalum pentachloride, $TaCl_5$, (82.53 mmol.), and trimethylsilylmethylmagnesium chloride, $(CH_3)_3SiCH_2MgCl$ (453.9 mmol.), in 800 mL diethyl ether at room temperature. The compound was recovered by stripping, filtering, extracting into hexane and then cooling at −20° C. for 12 h. Compound 2), bis-M-(trimethylsilylmethylidynyl)tetrakis(trimethylsilylmethyl) diniobium, was prepared as above substituting $NbCl_5$ for $TaCl_5$.

Example 1

Polymerization a) Methylalumoxane (5.0 ml of a 10 weight percent solution of methylalumoxane in toluene) and compound 1) (Ta, 1.2 mg dissolved in 1.0 ml toluene) were combined under an inert nitrogen atmosphere and transferred to a one liter autoclave batch reactor which was charged with 400 ml of hexane and 204 psi (1406 kPa) of ethylene. The contents were maintained at 60° C. for 30 minutes, then the polymerization was stopped by rapidly venting and cooling the reactor. The solid recovered was dried in a vacuum oven at 80° C. for 12 hours. The yield after drying was 10.4 g of polyethylene having $M_n=267,000$; $M_w=650,000$, MWD= 2.43.

b) The procedure of Example 1a was repeated except that compound 2) (Nb, 1.0 mg dissolved in 1.0 ml toluene) was used in place of compound 1). The Yield was 4 g of polymer having $M_n=340,000$; $M_w=759,000$, MWD=2.23.

Example 2

Polymerization

The procedure of example 1 was repeated except that dimethylanilinium perfluorotetraphenyl borate was used in place of the methylalumoxane. Compound 1) (0.100 g) and the dimethylanilinium perfluorotetraphenyl borate (0.900 g) were slurried together in 2.0 ml toluene and gently warmed until the solids were dissolved and a dark oil phase separated out of the mixture. This mixture was transferred to the one liter autoclave batch reactor, which was thereafter charged with 204 psi (1406 kpa) of ethylene. The temperature was maintained at 80° C. After five minutes an additional 0.100 g of compound 1) and 0.900 g of dimethylanilinium perfluorotetraphenyl borate, premixed and warmed as before, were added to the reactor. After 30 additional minutes, 10.0 g of polymer was obtained, $M_n=340,000$; $M_w=759,000$; MWD=2.24.

As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A polymerization catalyst composition comprising the reaction product of a bimetallocyclic compound and a cocatalyst, wherein said bimetallocyclic compound comprises two members independently selected from the group consisting of the Group 4 and Group 5 metal atoms Ti, Zr, Hf, Nb, and Ta, those members connected through two covalent bridging links so as to form a cyclic compound having delocalized π-bonding in the cyclic structure of said bimetallocyclic compound.

2. The catalyst composition of claim 1 wherein the bimetallocyclic compound is a derivative of the compound represented by the formula I:

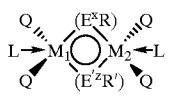    I wherein:
- $M_1$ and $M_2$ are both a group 4 or 5 metal selected from the group consisting of Ti, Zr, Hf, Nb, or Ta, in their highest oxidation state;
- each $E^xR$ and $E'^zR'$ is independently a bridging ligand in which each Y and Y' is an element selected from group 14 when $M_1$ and $M_2$ are Group 5 or group 15 when $M_1$ and $M_2$ are Group 4 of the Periodic Table of Elements; x and z are the valencies of E and E', respectively, such that when E or E' is a group 14 element, their valency is defined as 4, and when E or E' is a group 15 element, their valency is defined as 3;
- each R and R' is, independently, a radical selected from the group consisting of substituted or unsubstituted hydrocarbyl radicals, substituted with any additional $C_1$–$C_{30}$ hydrocarbyl radicals, provided that one or more of the hydrogen atoms on the additional hydrocarbyl radicals may be replaced by a halogen radical, a silyl radical, an amido radical, a phosphido radical, and alkoxy radical, or any other radical containing a Lewis acidic or basic functionality;
- each Q may be independently a univalent anionic ligand selected from the group consisting of a halide, hydride, substituted or unsubstituted hydrocarbyl radicals, substituted or unsubstituted silyl, substituted or unsubstituted alkoxy radicals, substituted or unsubstituted aryloxy radicals, substituted or unsubstituted amido radicals, substituted or unsubstituted phosphido radicals, further provided that two Q together may form a dianionic chelating ligand;
- L is a neutral Lewis base, one or more of which may or may not be present.

3. A process for polymerizing ethylenically or acetylenically unsaturated monomers comprising contacting said monomers under polymerization conditions with a catalyst composition according to claim 1.

4. The catalyst composition of claim 2 wherein each R and R' is, independently, a $C_1$–$C_{20}$ hydrocarbyl radical or a substituted $C_1$–$C_{20}$ hydrocarbyl radical.

5. The catalyst composition of claim 2 wherein each Q has one to thirty carbon atoms.

6. The catalyst composition of claim 2 wherein each L is independently selected from the group consisting of diethyl ether, tetrahydrofuran, dimethylaniline, aniline, trialkylphosphine and triarylphosphine.

7. A process for polymerizing ethylenically or acetylenically unsaturated monomers comprising contacting said monomers under polymerization conditions with a catalyst composition wherein the bimetallocyclic compound is represented by the formula according to claim 2.

8. The process of claim 7 wherein said cocatalyst is methylalumoxane.

9. The process of claim 7 wherein said cocatalyst is an ionizing activator capable of providing a compatible non-coordinating anion.

10. The catalyst composition of claim 1 wherein said bimetallocyclic compound is activated by combining with an alumoxane.

11. The catalyst composition of claim 1 wherein said bimetallocyclic compound is activated by combining with an ionizing activator capable of providing a compatible noncoordinating anion.

12. The catalyst composition of claim 10 wherein the alumoxane is methylalumoxane.

13. The catalyst composition of claim 11 wherein the ionizing activator is dimethylanilinium perfluorotetraphenyl borate, or trisperfluorophenylboron.

14. The catalyst composition of claim 2 wherein $M_1$ and $M_2$ are the same transition metal element and are bridged by identical groups $E^xR$ and $E'^zR'$.

15. The catalyst composition of claim 14 wherein $M_1$ and $M_2$ are selected from group 5 and both $E^xR$ and $E'^zR'$ groups are bridging alkylidyne groups.

16. The catalyst composition of claim 14 wherein $M_1$ and $M_2$ are selected from group 4 and both $E^xR$ and $E'^zR'$ groups are imido and phosphinidine groups.

17. The process of claim 3 wherein said cocatalyst is methylalumoxane.

18. The process of claim 3 wherein said cocatalyst is an ionizing activator capable of providing a compatible non-coordinating anion.

19. The catalyst composition of claim 1 wherein the bimetallocyclic compound is activated by a cocatalyst selected from the group consisting of group 13 alkyls, alumoxanes, and ionizing reagents capable of providing stable, compatible noncoordinating anions.

* * * * *